United States Patent [19]

Miki

[11] 4,401,282

[45] Aug. 30, 1983

[54] EMERGENCY LOCKING SEAT BELT RETRACTOR

[75] Inventor: Hiroyuki Miki, Sagamihara, Japan

[73] Assignee: Nissan Motor Co., Ltd., Yokohama, Japan

[21] Appl. No.: 290,072

[22] Filed: Aug. 4, 1981

[30] Foreign Application Priority Data

Aug. 19, 1980 [JP] Japan .......................... 55-117029[U]

[51] Int. Cl.³ ...................... A62B 35/02; B65H 75/48

[52] U.S. Cl. ............................................ 242/107.4 A

[58] Field of Search ................ 242/107.4 A; 280/806; 297/478, 480

[56] References Cited

U.S. PATENT DOCUMENTS

| | | | |
|---|---|---|---|
| 3,901,461 | 8/1975 | Stephenson et al. | 242/107.4 A |
| 3,913,861 | 10/1975 | Stephenson et al. | 242/107.4 A |
| 3,938,754 | 2/1976 | Stephenson et al. | 242/107.4 A |
| 3,938,755 | 2/1976 | Stephenson et al. | 242/107.4 A |
| 3,995,788 | 12/1976 | Stephenson et al. | 242/107.4 A |
| 4,069,988 | 1/1978 | Pouget | 242/107.4 A |
| 4,090,678 | 5/1978 | Yamanashi | 242/107.4 A |
| 4,127,240 | 11/1978 | Kell | 242/107.4 A |
| 4,193,564 | 3/1980 | Lindblad | 242/107.4 A |

FOREIGN PATENT DOCUMENTS

| | | | |
|---|---|---|---|
| 2816354 | 10/1978 | Fed. Rep. of Germany . | |
| 2803454 | 8/1979 | Fed. Rep. of Germany . | |
| 52-20524 | 2/1977 | Japan | 242/107.4 A |
| 55-94267 | 7/1980 | Japan . | |
| 55-104446 | 7/1980 | Japan . | |

*Primary Examiner*—John M. Jillions

*Attorney, Agent, or Firm*—Thompson, Birch, Gauthier & Samuels

[57] ABSTRACT

In an emergency locking seat belt retractor including a housing, a belt take-up shaft rotatably disposed in the housing for winding thereon a seat belt, a return spring for biasing the belt take-up shaft to rotate in a direction to retract the belt, a locking device for locking, when actuated, the belt take-up shaft against rotation in a direction to withdraw the seat belt, a shock sensing device for sensing a predetermined degree of shock applied thereto, and a transmitting device for actuating the locking device when the shock sensing device senses the predetermined degree of shock, the shock sensing device being pivotally connected to the housing by means of a pivot bolt.

13 Claims, 3 Drawing Figures

10
12
12a
12b
12c
12d
12e
14
14a
16
18
22
24
26
28
28a
32
32a
32b
34
34a
36
38
38a
40
42
44
44a
44b
46
48
50
52
52a
54
56
58
60
62
62a
64
64a
64b
64c
66

EMERGENCY LOCKING SEAT BELT RETRACTOR

BACKGROUND OF THE INVENTION

1. Field of the Invention

The present invention relates in general to an emergency locking seat belt retractor of a motor vehicle which instantly locks the seat belt when sensing a predetermined degree of shock applied thereto, and more particularly to an emergency locking seat belt retractor of a so-called deceleration sensing type which instantly inhibits the withdrawal of the seat belt upon sensing a predetermined degree of deceleration of the vehicle as in a case of vehicle collision.

2. Description of the Prior Art

Hitherto, as emergency locking seat belt retractors, there have been proposed a deceleration sensing type and a belt movement sensing type. The former is one which locks the belt upon sensing a deceleration of the vehicle, while the latter is one which locks the belt upon sensing a rapid withdrawing movement of the belt. It is generally known that the former, that is the deceleration sensing type retractor, has a quicker locking operation than the latter.

In the deceleration sensing type retractor, a so-called "G-sensor" is employed which is arranged to be vertically positioned. However, in the conventional deceleration sensing type retractor, it is usual that the G-sensor is fixedly set in the retractor proper. Thus, when mounting the retractor to the vehicle, the retractor must be mounted so that the G-sensor is vertically positioned. However, as is known, the size and/or dimensions of the mounting space provided in the vehicle for mounting thereon the retractor varies depending on the type of the vehicle, so that it is necessary to produce a specially designed seat belt retractor for each vehicle. Of course, this increases the cost of production of the retractor.

SUMMARY OF THE INVENTION

It is therefore an object of the present invention to provide an emergency locking seat belt retractor which is adopted to be used in various kinds of motor vehicles.

According to the present invention, there is provided an emergency locking seat belt retractor which comprises a housing, a belt take-up shaft rotatably disposed in the housing for winding thereon a seat belt; biasing means for biasing the belt take-up shaft to rotate about its axis in a direction to retract the seat belt, a locking device for locking, when actuated, the belt take-up shaft against rotation in a direction to withdraw the seat belt from the shaft, a shock sensing device for sensing a predetermined degree of shock applied thereto, and a transmitting device for actuating the locking device when the shock sensing device senses the predetermined degree of shock, wherein the shock sensing device is pivotally connected to the housing so that the shock sensing device functions properly regardless of the mounting orientation of the retractor housing.

BRIEF DESCRIPTION OF THE DRAWINGS

Other objects and advantages of the present invention will become clear from the following description when taken in conjunction with the accompanying drawings, in which.

DETAILED DESCRIPTION OF THE INVENTION

Figure 1:
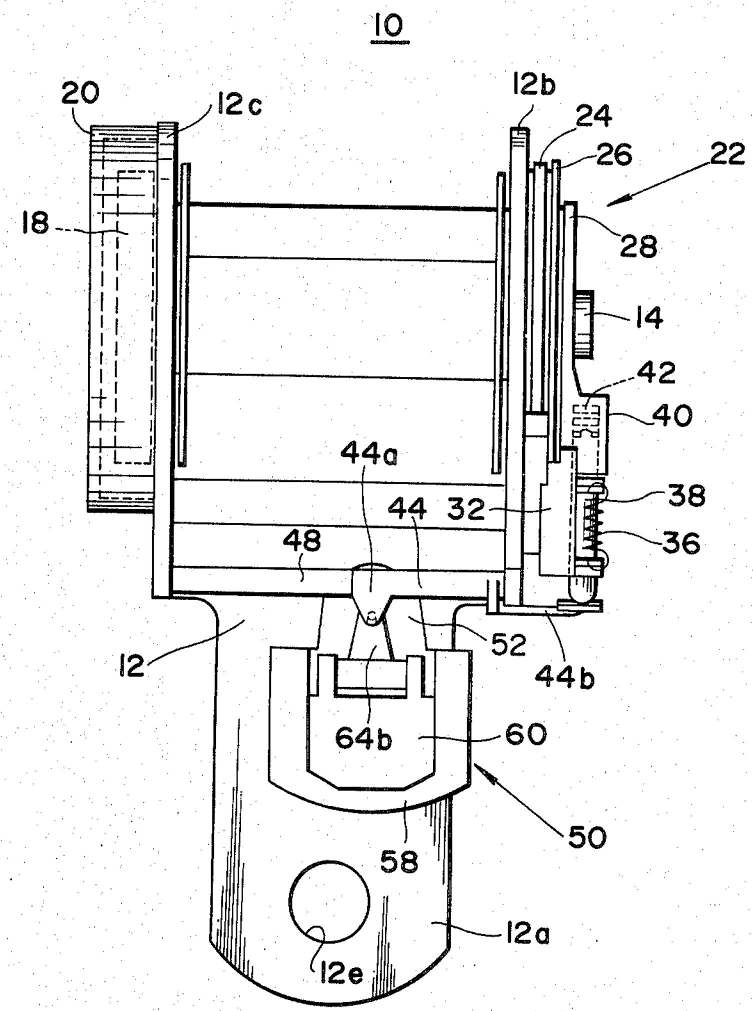
FIG. 1 is front view of an emergency locking seat belt retractor according to the present invention.
Figure 2:
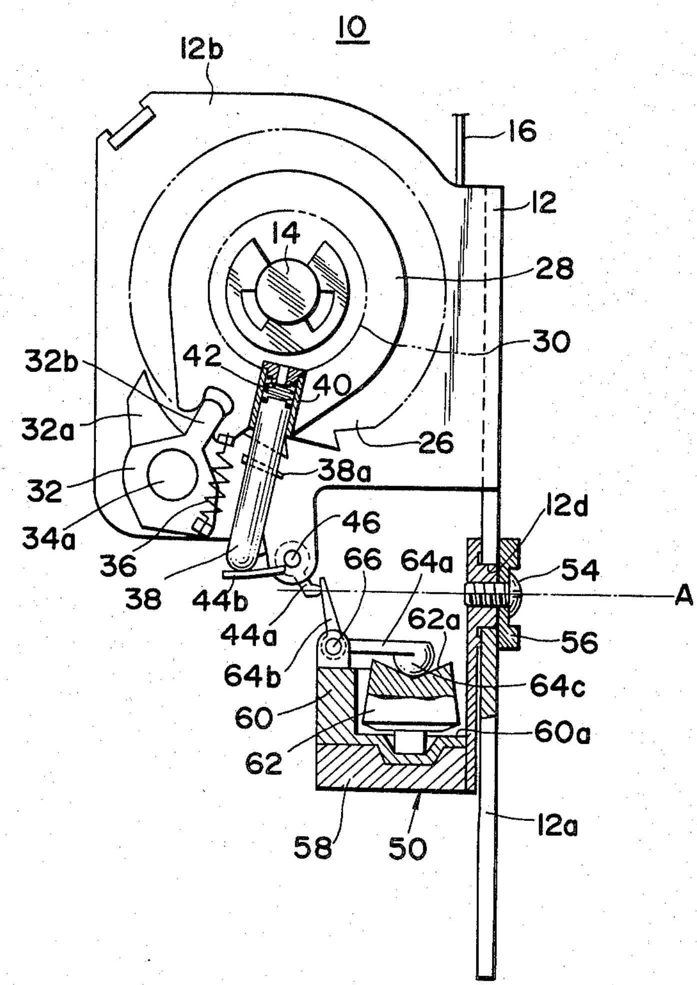
FIG. 2 is a partially sectioned side view of the emergency locking seat belt retractor of the invention.
Figure 3:
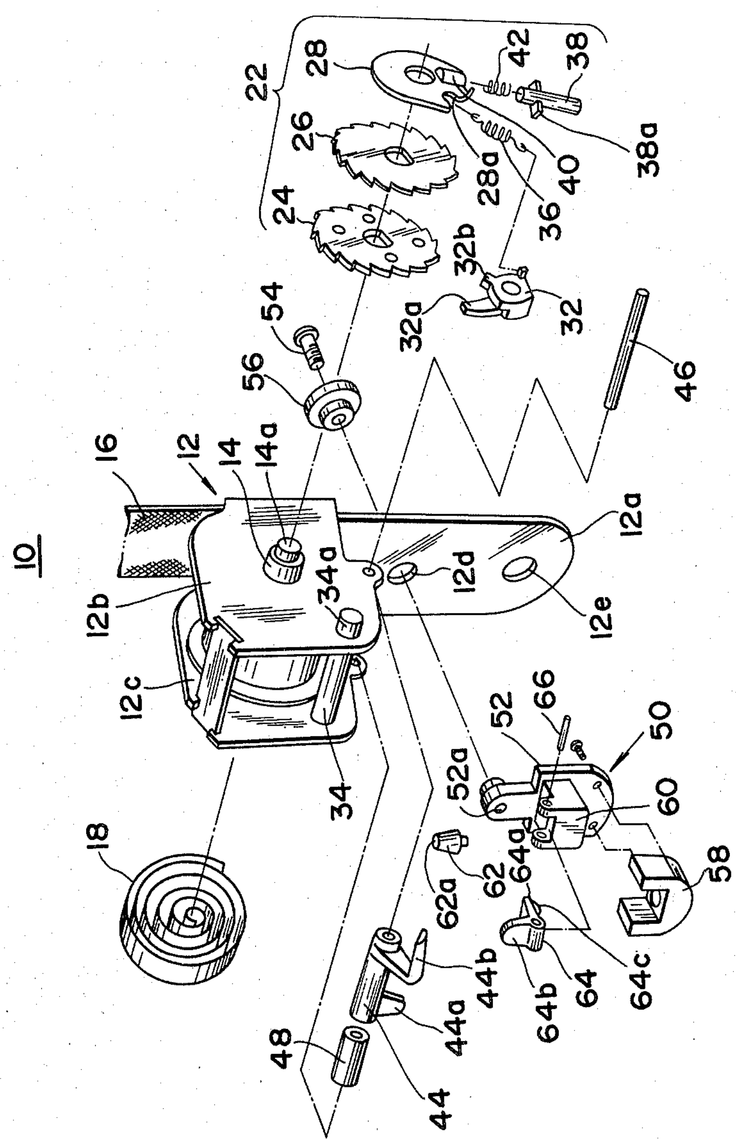
FIG. 3 is an exploded view of the emergency locking seat belt retractor of the invention.

Referring to FIGS. 1 to 3, especially FIG. 3, there is shown an emergency locking seat belt retractor 10 according to the present invention. The retractor 10 comprises a housing 12 including an elongate base portion **12*a* and two side walls 12*b* and 12*c*. A belt take-up shaft 14 is spanned and supported by the side walls 12*b* and 12*c* in a manner to be rotatable about the axis thereof. As is clearly shown by FIG. 3, the right hand end of the shaft 14 is reduced in diameter to form a crescent portion 14*a* which is engaged with a locking device 22 which will be described hereinafter. A seat belt 16 is wound on the shaft 14 with its one end secured to the shaft 14, and a return spring 18 is mounted on the side wall 12*c* of the housing 12 to bias the belt take-up shaft 14 to rotate in a direction to retract the belt 16. As is shown by FIG. 1, the return spring 18 is housed in a cover 20 secured to the side wall 12*c* of the housing 12**.

A locking device 22 is arranged to inhibit the withdrawal of the belt 16 when operated. As is clearly shown in FIG. 3, the locking device 22 comprises a main ratchet wheel 24 and an auxiliary ratchet wheel 26 which are coaxially and fixedly disposed on the crescent portion **14*a* of the belt take-up shaft 14 to be rotated therewith. A clutch wheel 28 is coaxially and rotatably disposed on the crescent portion 14*a* of the shaft 14 so that the clutch wheel 28 can rotate about its axis relative to the shaft 14. As is seen in FIG. 2, a C-shaped fastener 30 is fixed to the crescent portion 14*a* for preventing dislocation of the wheels 24, 26 and 28 on the shaft 14. A locking pawl 32 is pivotally disposed on a stud 34*a* mounted on the side wall 12*b* of the housing 12. In the embodiment disclosed, the stud 34*a* is shown to be a part of a strut 34 of the housing 12. The locking pawl 32 has a detent 32*a* which is engageable with the teeth of the main ratchet wheel 24 so that when the detent 32*a* is meshingly engaged with one of the teeth of the main ratchet wheel 24, the withdrawing movement of the seat belt 16 is inhibited. It should be noted however that by the nature of the ratchet wheel 24 having the inclined teeth, the retracting movement of the belt take up shaft 14 is permitted even when the detent 32*a* of the pawl member 32 is in engagement with the teeth of the ratchet wheel 24. The locking pawl 32 further has a small projection 32*b* which is loosely received in a recess 28*a* formed in the clutch wheel 28 so that the pivotal movement of the clutch wheel 28 induces the simultaneous pivotal but reversed movement of the locking pawl 32 about the stud 34*a*. A spring 36 is arranged between the locking pawl 32 and the clutch wheel 28 for biasing the locking pawl 32 in a direction to disengage from the teeth of the main ratchet wheel 24. A rod-shaped slider 38 is axially slidably received in a tube 40 which is formed on the clutch wheel 28. A spring 42 is disposed in the tube 40 for biasing the slider 38 radially outwardly. The slider 38 is provided with a pawl portion 38*a* which is meshingly engaged with one of the teeth of the auxiliary ratchet wheel 26 when the slider 38 takes a predetermined position. With the construction mentioned above, it will be noted that when the pawl portion 38***a* of the slider 38 is kept engaged with one tooth of the auxiliary ratchet wheel 26, a slight rotation of the belt take-up shaft 14 in the belt withdrawing direction brings about a slight rotation of the clutch wheel 28 in the corresponding direction by the assist of the auxiliary ratchet wheel 26, thereby causing the locking pawl 32 to swing in a direction to engage with the main ratchet wheel 24. Thus, the belt take-up shaft 14 becomes locked against rotation in the belt withdrawing direction.

A link 44 is supported between the side walls 12*b* and 12*c* of the housing 12 by a pin 46 so that the link 44 is rotatable about the pin 46. A spacer 48 adjoins the link 44. As is best shown in FIG. 3, the link 44 is provided at its one end with a straight arm 44*a* and at the other end with a crank arm 44*b*. As will be seen from FIG. 1 or 2, the crank arm 44*b* is so arranged as to support the head portion of the slider 38 so that when the link 44 swings in a given direction about the axis thereof, the crank arm 44*b* pushes up the slider 38 against the biasing force of the spring 42 into the predetermined position where the pawl portion 38*a* of the slider 38 is in engagement with the auxiliary ratchet wheel 26.

A deceleration sensing device is generally designated by numeral 50. The device 50 comprises a pendulum plate 52 having at its upper portion a threaded opening 52*a*. The pendulum plate 52 is swingably connected to the elongate base portion 12*a* of the housing 12 by means of a bolt 54 which passes through an opening 12*d* of the housing base portion 12*a* and is screwed to the threaded opening 52*a* of the pendulum plate 52. For achieving smooth swinging movement of the pendulum plate 52, a bush 56 is fitted to the opening 12*d*. A generally U-shaped weight 58 is bolted to the outer side of the pendulum plate 52, and a sensor base 60 is also secured to the pendulum plate 52 in a manner to be embraced by the U-shaped weight 58. As is clearly shown in FIG. 2, the sensor base 60 is formed with a blind hole 60*a* in which a spinning top-shaped sensor weight 62 is set. As will become clear as the description proceeds, the sensor weight 62 is so arranged that in a normal condition, it is vertical as illustrated in FIG. 2, but upo receiving a predetermined inertia force, it is inclined. The sensor weight 62 is formed at its upper surface with a conical recess 62*a*. A wing element 64 having two angularly spaced wing portions 64*a* and 64*b* is pivotally supported by a pin 66 between two spaced projections (no numerals) formed on the sensor base 60. As is best shown in FIG. 2, the wing portion 64*a* is formed with a semispherical boss 64*c*. The arrangement of the wing element 64 is so made that the semispherical boss 64*c* and the wing portion 64*b* are in contact with the center of the conical recess 62*a* of the sensor weight 62 and the afore-mentioned straight arm 44*a* of the link 44, respectively. As will be understood from a phantom line "A" in FIG. 2, the wing portion 64*b* contacts the straight arm 44*a* at a point in alignment with the rotating axis of the pendulum plate 52, that is, at a point in alignment with the axis of the bolt 54. With this measure, the contact engagement between the wing portion 64*b* and the straight arm 44*a* is constantly kept irrespective of any angular positions which the pendulum plate 52 takes relative to the elongate base portion 12*a* of the housing 12.

Upon mounting the retractor 10 thus constructed to a vehicle, for example, to a side portion of a passenger seat, one bolt (not shown) is used for achieving pivotal movement of the retractor 10 relative to the vehicle body. For this purpose, the elongate base portion 12*a* of the housing 12 is formed with a circular opening 12*e* through which the bolt passes. In the invention, however, it is important to arrange the retractor 10 in such a manner that the major surface of the elongate base portion 12*a* of the housing 12 is parallel with a vertical plane, so that the swingable movement of the retractor 10 about the pivot bolt is made by permitting the major surface of the base portion 12*a* to move parallel to the vertical plane. Now, it is to be noted that the pendulum unit which includes the plate 52, the weight 58 and the sensor base 60 is compelled to hang down vertically irrespective of the setting angle of the housing 12 relative to the vehicle body.

Operation will be described in the following with reference to FIG. 2. For easy understanding of the operation, the explanation will commence with respect to a condition wherein the vehicle is cruising and a passenger on a seat uses the seat belt 16. In this condition, the seat belt retractor 10 of the invention takes the position illustrated by FIG. 2 in which the sensor weight 62 is substantially vertical causing the wing element 64, the link 44 and the slider 38 to take their rest or inoperative positions. With the slider 38 taking its rest position, the pawl portion 38*a* of the slider 38 is kept disengaged from the auxiliary ratchet wheel 26, so that the rotation of the auxiliary ratchet wheel 26 induced by withdrawal of the seat belt 16 from the housing 12 does not induce the rotation of the clutch wheel 28. Thus, the locking pawl 32 does not engage the main ratchet wheel 24 because of the reason mentioned hereinbefore. Thus, in this normal condition, the seat belt 16 is freely withdrawable from the retractor 10.

When the vehicle is subjected to a vehicle collision, the sensor weight 62 is instantly inclined making the lower center portion thereof act as a pivot before the pendulum unit starts to swing forward or rearward. With the sensor weight 62 now inclined, the wing portion 64*a* of the wing element 64 is moved up thereby turning the wing element 64 counterclockwise in FIG. 2 and thus turning the link 44 clockwise. With the link 44 thus turned, the crank arm 44*b* of the link 44 pushes up the slider 38 to the position where the pawl portion 38*a* is in engagement with the teeth of the auxiliary ratchet wheel 26. Thus, the slight withdrawal of the seat belt 16 which inevitably occurs due to forward inclination of the seat belt wearer brings about a slight rotation of the clutch wheel 28 in a counterclockwise direction in FIG. 2, so that locking pawl 32 turns clockwise bringing the detent 32*a* into engagement with one of the teeth of the main clutch wheel 24. Thus, the belt take-up shaft 14 is locked against rotation in the belt withdrawing direction. Thus, the passanger is safely restrained by the belt.

According to the present invention, the following advantages are obtained:

(a) Since the deceleration sensing device 50 is arranged to pivotally hang down from the retractor housing 12 by its own weight, the mounting of the retractor 10 to the vehicle body can be arbitrarily made without considering the setting angle of the retractor 10 relative to the vehicle body. This means that the retractor according to the present invention is widely applicable to various kinds of motor vehicles. Further, since the setting angle of the retractor 10 is not limited in the invention, one kind of a retractor can be commonly applicable to both a leftside seat and a rightside seat which have different retractor mounting spaces. These features produce a remarkably low production cost of the retractor.

(b) Since the retractor 10 is pivotally connected to the vehicle body by means of the pivot bolt (not shown) passing through the opening 12*e* of the housing 12, the retractor 10 can swing in accordance with the movement of the seat belt wearer. This enhances the comfort of the wearer.

what is claimed is:

1. An emergency locking seat belt retractor comprising:

a housing (12), a belt take-up shaft (14) rotatably disposed in said housing for winding thereon a seat belt (16), biasing means (18) for biasing said belt take-up shaft to rotate about its axis in a direction to retract said seat belt, a locking device (22) for locking, when actuated, said belt take-up shaft against rotation in a direction to unroll the seat belt from said shaft, a shock sensing device (50) for sensing a predetermined degree of shock applied thereto, and a transmitting device (44, 64) for actuating said locking device when said shock sensing device senses the predetermined degree of shock, wherein said shock sensing device is pivotally connected to said housing so that regardless of the angular orientation of said housing, said shock sensing device hangs down vertically, and wherein said shock sensing device comprises a pendulum plate (52) having an end pivotally connected to said housing, a weight (58) secured to said pendulum plate (52), a sensor base (60) secured to said pendulum plate and having at its upper surface a blind hole (60*a*) and a sensor weight (62) which is set in said blind hole in such a manner that in a stationary condition, said sensor weight stands straight, but upon receiving a predetermined inertia force, said sensor weight is inclined, and wherein said end of said pendulum plate is formed with a threaded opening (52*a*) with which a bolt (54) passing through an opening (12*d*) of said housing is engaged so as to achieve the pivotal connection of said pendulum plate relative to said housing, and wherein a bush (56) is fitted to said opening (12*d*) of said housing for achieving smooth pivotal movement of said pendulum plate relative to said housing, and wherein said transmitting device comprises a wing element (64) pivotally mounted on said sensor base and provided with angularly spaced first and second wing portions (64*a*, 64*b*), said first wing portion being in contact with the top of said sensor weight, a link (44) disposed in said housing and rotatable about the axis thereof, said link being formed with axially spaced first and second arms (44*a*, 44*b*) which are in contact with said second wing portion of said wing element and a part (38) of said locking device (22), respectively.

2. An emergency locking seat belt retractor as claimed in claim 1, in which said second arm of said link is bent normal to form a crank arm.

3. An emergency locking seat belt retractor as claimed in claim 2, in which said second wing portion contacts said first arm at a point in alignment with the pivot axis of said pendulum plate.

4. An emergency locking seat belt retractor as claimed in claim 3, in which said locking device comprises main and auxiliary ratchet wheels coaxially and securely mounted on said belt take-up shaft and rotating therewith; a clutch wheel coaxially and rotatably mounted on said belt take-up shaft; a locking pawl pivotally mounted on said housing and having a detent which is engageable with said main ratchet wheel to lock the same against rotation in a direction to unroll the seat belt from said belt take-up shaft; biasing means for biasing said locking pawl in a direction to disengage from said main ratchet wheel; first connection means for achieving simultaneous rotation of said auxiliary ratchet wheel and said clutch wheel when said link is rotated beyond a predetermined angle; and second connection means for achieving simultaneous pivoting movement of said locking pawl and said clutch wheel.

5. An emergency locking seat belt retractor as claimed in claim 4 in which said first connection means comprises a rod-shaped slider formed with a pawl portion thereon; a tube formed on said clutch wheel and extending radially; and a spring disposed in said tube to bias said slider radially outwardly, wherein said pawl portion is brought into engagement with said auxiliary ratchet wheel when said slider is moved inwardly against the force of said spring by a predetermined distance.

6. An emergency locking seat belt retractor as claimed in claim 9, in which said second connection means comprises a projection formed on said locking pawl and a recess formed in said clutch plate, said projection being loosely received in said recess.

7. An emergency locking seat belt retractor comprising:

a housing (12);

a belt take-up shaft (14) rotatably disposed in said housing for winding thereon a seat belt (16);

biasing means (18) for biasing said belt take-up shaft to rotate about its axis in a direction to retract said seat belt;

a locking device (22) for locking, when actuated, said belt take-up shaft against rotation in a direction to unroll said seat belt from said shaft;

a shock sensing device (5) for sensing a predetermined degree of shock applied thereto, said device including a pendulum plate (52) having an upper portion pivotally connected to said housing, a sensor base (60) secured to said pendulum plate and having at its upper surface a blind hole (60*a*) and a sensor weight (62) which is set in said blind hole in such a manner that in a stationary or normal condition, said sensor weight stands straight, but upon receiving a predetermined inertia force, said sensor weight is inclined; and a movement transmitting device (44, 64) for actuating said locking device when said shock sensing device moves upon sensing the predetermined degree of shock, said movement transmitting device including a wing element (64) pivotally mounted on said sensor base and provided with angularly spaced first and second wing portions (64*a*, 64*b*), said first wing portion being in contact with the top of said sensor weight (62), a link (44) disposed in said housing to be rotatable about the axis thereof, said link being formed with axially spaced first and second arms (44*a*, 44*b*) which are in contact with said second wing portion of said wing element and a part (38) of said locking device (22), respectively, said part of said locking device inducing the locked condition of said belt take-up shaft when moving in a given direction.

8. An emergency locking seat belt retractor as claimed in claim 7, in which said upper portion of said pendulum plate of said shock sensing device is formed with a threaded opening (52*a*) with which a bolt (54) passing through an opening (12*d*) of said housing is engaged so as to achieve the pivotal connection of said pendulum plate relative to said housing.

9. An emergency locking seat belt retractor as claimed in claim 8, in which a bush (56) is fitted to said opening of said housing for achieving smooth pivotal movement of said pendulum plate relative to said housing.

10. An emergency locking seat belt retractor as claimed in claim 9, in which said second arm (44*b*) of said link of said movement transmitting device is bent normal to form a crank arm.

11. An emergency locking seat belt retractor as claimed in claim 10, in wich said locking device comprises main and auxiliary ratchet wheels (24, 26) coaxially and securely mounted on said belt take-up shaft and rotatable therewith; a clutch wheel (28) coaxially and rotatably mounted on said belt take-up shaft; a locking pawl (32) pivotally mounted on said housing and having a detent (32*a*) which is engageble with said main ratchet wheel (24) to lock the same against rotation in a direction to unroll said seat belt from said belt take-up shaft; biasing means (36) for biasing said locking pawl in a direction to disengage from said main ratchet wheel; first connection means (38, 38*a*, 40, 42) for achieving simultaneous rotation of said auxiliary ratchet wheel 826) and said clutch wheel (28) when said link (44) is rotated beyond a predetermined angle; and second connection means (32*b*, 28*a*) for achieving simultaneous pivoting movement of said locking pawl (32) and said clutch wheel (28).

12. An emergency locking seat belt retractor as claimed in claim 11, in which said first connecting means comprises a rod-shaped slider (38) which acts as part of said locking device, said slider being formed with a pawl portion (38*a*) thereon; a tube (40) formed on said clutch wheel and extending radially; and a spring (42) disposed in said tube to bias said slider radially outwardly, wherein said pawl portion is brought into engagement with said auxiliary ratchet wheel when said slider is moved inwardly against the force of said spring by a predetermined distance.

13. An emergency locking seat belt retractor as claimed in claim 12, in which said second connection means comprises a projection (32*b*) formed on said locking pawl, and a recess (28*a*) formed in said clutch plate (28), said projection being loosely received in said recess.

* * * * *

UNITED STATES PATENT AND TRADEMARK OFFICE

CERTIFICATE OF CORRECTION

PATENT NO. : 4,401,282
DATED : August 13, 1983
INVENTOR(S) : Hiroyuki Miki

It is certified that error appears in the above-identified patent and that said Letters Patent are hereby corrected as shown below:

In Claim 6, column 6, line 23, cancel "claim 9" and insert --claim 5--

In Claim 7, column 6, line 27, cancel "energency" and insert --emergency--

In Claim 11, column 7, line 13, cancel "wich" and insert --which--

In Claim 11, column 7, line 19, cancel "engageble" and insert --engageable--

In Claim 11, column 8, line 2, cancel "826)" and insert --(26)--

Signed and Sealed this

*Twentieth* Day of *December 1983*

[SEAL]

*Attest:*

GERALD J. MOSSINGHOFF

*Attesting Officer* *Commissioner of Patents and Trademarks*